United States Patent
Shiotani (10) Patent No.: US 6,485,285 B1
(45) Date of Patent: Nov. 26, 2002

(54) REMOVAL APPARATUS FOR MOLDED PRODUCT AND METHOD FOR REMOVING MOLDED PRODUCTS

(75) Inventor: Yousuke Shiotani, Nagoya (JP)

(73) Assignee: Star Seiki Co., Ltd., Nagoya (JP)

( * ) Notice: Subject to any disclaimer, the term of this patent is extended or adjusted under 35 U.S.C. 154(b) by 0 days.

(21) Appl. No.: 09/565,868

(22) Filed: May 5, 2000

(30) Foreign Application Priority Data

Mar. 13, 2000 (JP) .................................... 2000-068024

(51) Int. Cl.[7] .......................... B29C 43/48; B29C 45/42
(52) U.S. Cl. ............... 425/139; 414/225.01; 414/751.1; 425/422; 425/444; 425/556; 901/23
(58) Field of Search .......................... 425/436 R, 444, 425/422, 556, 139; 414/225.01, 626, 751.1, 752.1; 901/23, 25

(56) References Cited

U.S. PATENT DOCUMENTS

| | | | | |
|---|---|---|---|---|
| 3,947,208 A | * | 3/1976 | Broderick | 425/436 R |
| 4,449,914 A | * | 5/1984 | Schmidts et al. | 425/556 |
| 4,714,400 A | * | 12/1987 | Barnett et al. | 414/751.1 |
| 4,732,554 A | * | 3/1988 | Hellmann | 425/139 |
| 4,781,571 A | * | 11/1988 | Heindle et al. | 425/556 |
| 4,836,111 A | * | 6/1989 | Kaufmann | 104/89 |
| 5,000,654 A | * | 3/1991 | Shiotani | 414/751 |
| 5,382,155 A | * | 1/1995 | Boix Jaen | 425/577 |
| 5,629,031 A | * | 5/1997 | Ishikawa et al. | 425/139 |
| 5,912,028 A | * | 6/1999 | Airas et al. | 425/556 |
| 6,264,419 B1 | * | 7/2001 | Schinzel | 414/751.1 |

* cited by examiner

*Primary Examiner*—Jan H. Silbaugh
*Assistant Examiner*—Emmanuel S. Luk
(74) *Attorney, Agent, or Firm*—Frishauf, Holtz, Goodman & Chick, P.C.

(57) ABSTRACT

A removal apparatus is provided which includes a travelling frame, first and second carriages provided on the travelling frame, first and second cross frames provided on the first and second carriages, first and second cross carriages provided on the first and second cross frames, first and second vertical units provided on the first and second cross carriages, and first and second chucking units secured to the first and second vertical units. In addition, a control unit is provided for synchronously controlling the movement of the first and second carriages, the first and second cross carriages, and the first and second vertical units so as to enable the first and second chucking units to be moved in three dimensions for removal of a molded product from a molding machine.

2 Claims, 9 Drawing Sheets

REMOVAL APPARATUS FOR MOLDED PRODUCT AND METHOD FOR REMOVING MOLDED PRODUCTS

DETAILED DESCRIPTION OF THE INVENTION

1. Field of the Invention

The present invention relates to a removal apparatus for molded product and a method for removing molded products.

2. Background of the Invention

In the prior arts, a removal apparatus for molded product, which takes out molded products by moving and controlling a chuck portion in three-dimensional directions, has been already known, wherein the apparatus is provided with a cross travelling carriage supported so that it reciprocates in the axial direction (cross direction) of a molding machine on a cross frame of a carriage reciprocating in a direction (longitudinal direction) orthogonal to the axial line of the molding machine on a travelling frame fixed on a fixed surface plate of the molding machine, and a vertical unit which moves a chuck portion for holding molded products in the vertical direction.

It is necessary to attach a large-sized chucking portion that is capable of holding large-sized products, in order to remove large-sized products such as a bumper, dash panel, etc., of a vehicle by using the removal apparatus for molded product. But, since the large-sized chucking portion itself is heavy, in order for such a large-sized chucking portion to move at high accuracy and at a high speed, the vertical unit, cross frame, cross travelling carriage, and carriage and/or travelling frame must be made large-sized to have high rigidity, and the drive mechanism must be required to have a high power output. As a result, the conventional removal apparatus for molded product is large-sized and very heavy.

Also, it is necessary to design the chucking portion itself so as to have a holding force suitable for large-sized products, and the removal apparatus for molded product will be provided exclusively for the purpose.

It is therefore an object of the invention to provide a removal apparatus for molded product which is capable of removing large-size products using a light-weight and small-sized universal chucking portion and a method for removing molded products.

It is another object of the invention to provide a molded product taking apparatus whose production cost is reduced by decreasing the scale and weight thereof, and a method for removing molded products.

It is still another object of the invention to provide a removal apparatus for molded product which is capable of removing large-sized molded products while keeping the size thereof small, and a method for removing molded products.

To accomplish those objects, the removing apparatus for molded product of the present invention comprises a travelling frame extending between the upper part of a molding section and a release position outside a molding machine in a direction orthogonal to the axial line direction of the molding machine, first and second carriages individually controlled so as to reciprocate in said direction orthogonal to the axial line on said travelling frame, first and second cross carriages individually controlled so as to reciprocate in the axial line direction on the first and second cross frames provided so as to extend in the axial line direction of the respective first and second carriages, first and second vertical units provided on the first and second cross carriages, which move first and second chucking units holding a molded product, respectively, in the vertical direction and a means for controlling to individually move the first and second carriages, first and second cross carriages, and first and second vertical units.

PREFERRED EMBODIMENTS OF THE INVENTION

Hereinafter, a description is given of preferred embodiments of the invention with reference to the accompanying drawings;

Referring to FIG. 1 through FIG. 4, a travelling frame 3 of a removal apparatus for molded product has a base portion fixed on the upper part of a fixed surface plate 2 of a molding machine. In the longitudinal direction, the travelling frame 3 has a length bridging from the upper part of a molding section of the molding machine to a release position at the side of the molding machine. The first and second carriages 5 and 7, respectively, are supported on the travelling frame 3 so as to independently reciprocate in the longitudinal direction. And the first and second carriages 5 and 7 are, respectively, provided with first and second cross frames 13 and 15 extending in the cross direction.

Figure 1:
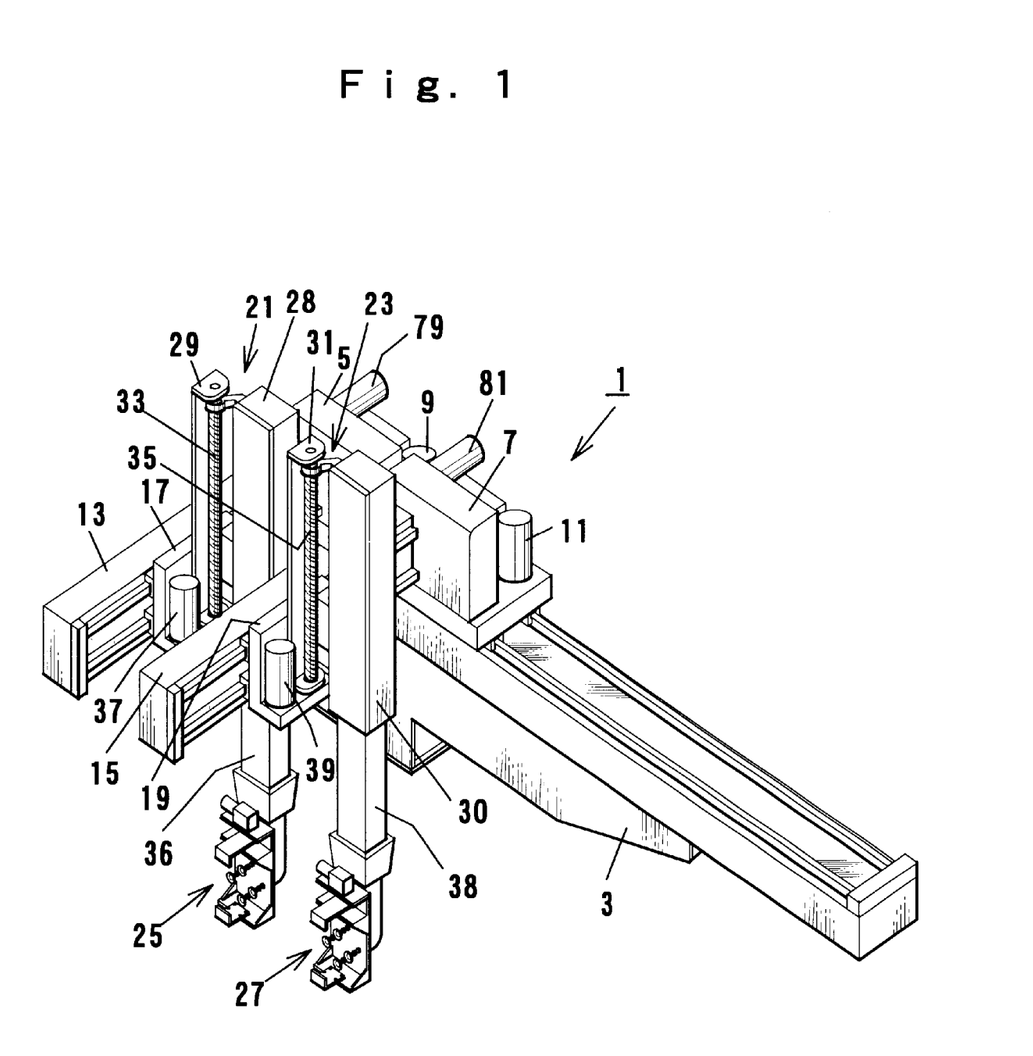
FIG. 1 is a perspective view showing the entirety of a removal apparatus for molded product.
Figure 2:
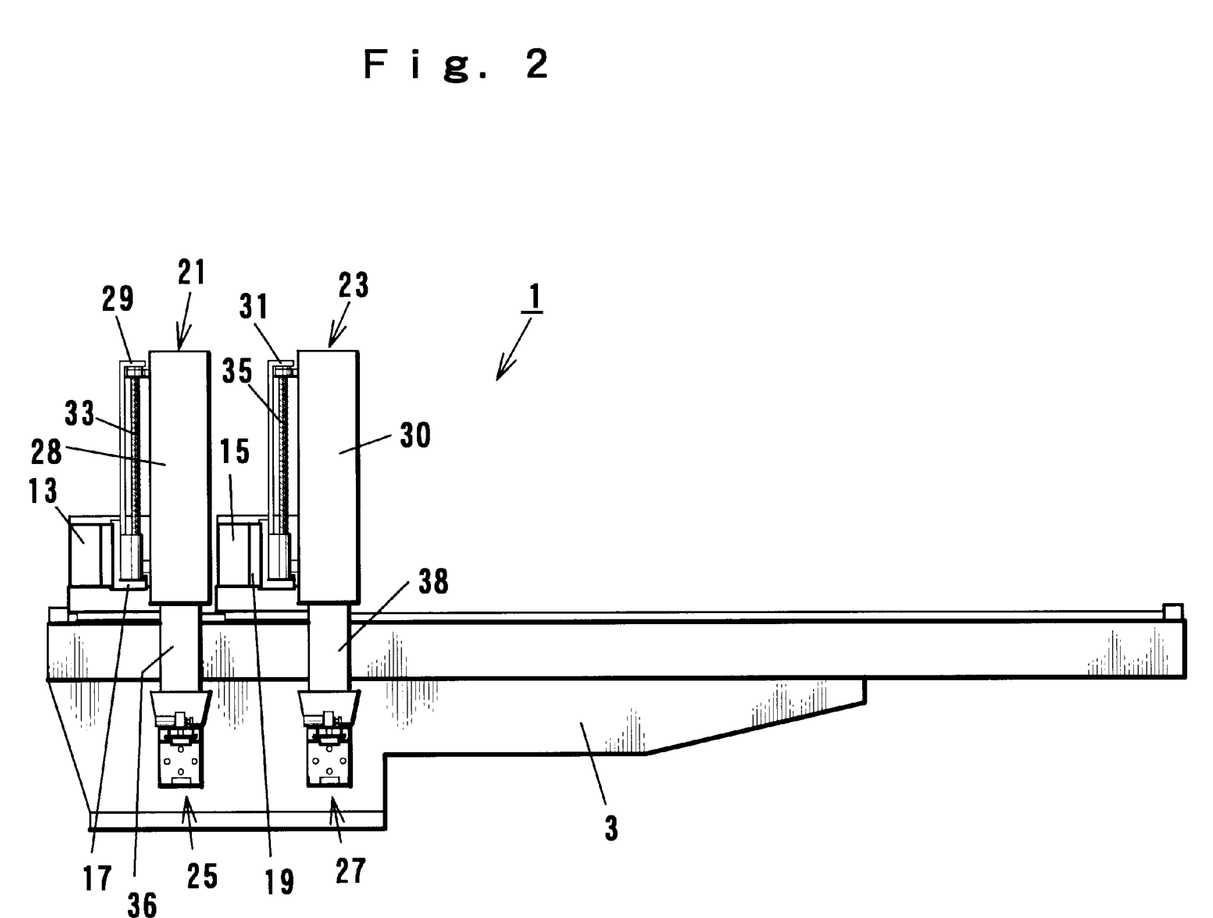
FIG. 2 is a front elevational view of the removal apparatus for molded product.

As a drive mechanism to cause the first and second carriages 5 and 7 to reciprocate, a rack and pinion drive mechanism is employed, wherein the rack and pinion drive mechanism consists of a rack gear and toothed belt (neither illustrated) attached to the travelling frame 3, and a pinion gear (not illustrated, engageable with the rack gear and toothed belt, which is attached to a rotating axis of the first and second electric motors 9 and 11 such as numerically controllable servo motors incorporated in the first and second carriages 5 and 7.

The first and second cross carriages 17 and 19 are, respectively, supported on the first and second cross frames 13 and 15 so as to be independently movable. The first and second vertical units 21 and 23 are, respectively, attached to the first and second cross carriages. 17 and 19, and the first and second chucking units 25 and 27 are attached to the lower part of the first and second vertical units 21 and 23.

Figure 3:
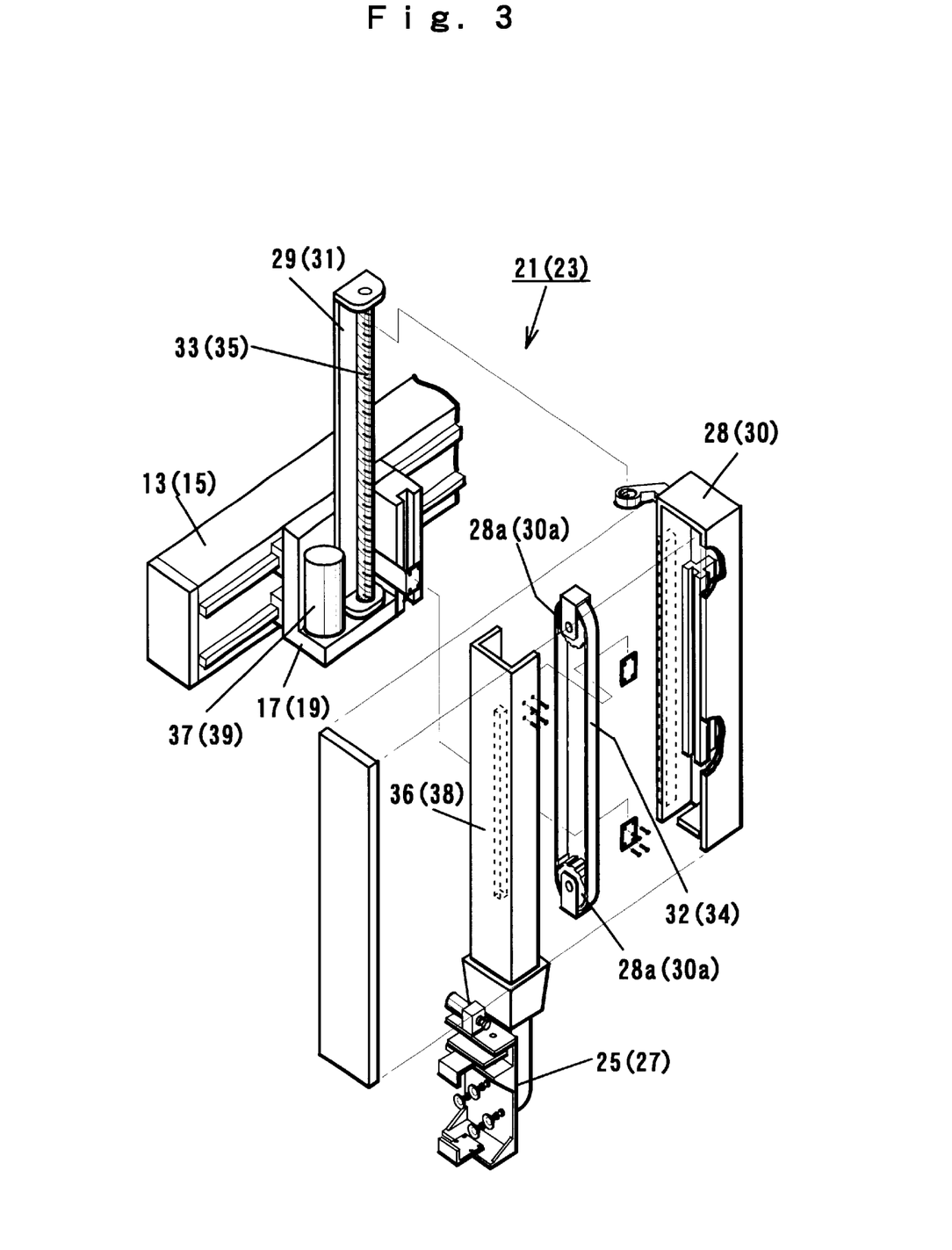
FIG. 3 is a disassembled perspective view showing an example of a vertical unit.

As shown in FIG. 3, feed screws 33 and 35 are rotatably supported on the vertical frames 29 and 31 erect on the first and second cross carriages 17 and 19, and have axial lines in the vertical direction, to which electric motors 37 and 39 such as numerically controllable servo motors are connected.

The first and second movable frames 28 and 30, which are supported at the cross carriages 17 and 19 and have a vertical length almost coincident with the axial line length of the feed screws 33 and 35, are engaged with the feed screws 33 and 35. Belts 32 and 34, a part of which is fixed at the cross carriages 17 and 19, are, respectively, extended on the rotating members 28a and 30a pivotally supported at the respective ends of the first and second movable frames 28 and 30. In addition, a part of the belts 32 and 34 is fixed at the first and second movable frames 28 and 30, and the first and second attaching frames 36 and 38, having a vertical length almost coincident with the first and second movable frames 28 and 30, are vertically movably supported the first and second movable frames 28 and 30.

The first and second vertical units 21 and 23 move the first and second movable frames 28 and 30 in the vertical direction by rotating feed screws 33 and 35 and by causing the belts 32 and 34 to travel, the first and second attaching frames 36 and 38 are moved in the vertical direction, whereby the first and second chucking units 25 and 27 are caused to move at a distance and speed approximately two times the axial line length of the feed screws 33 and 35.

Figure 4:
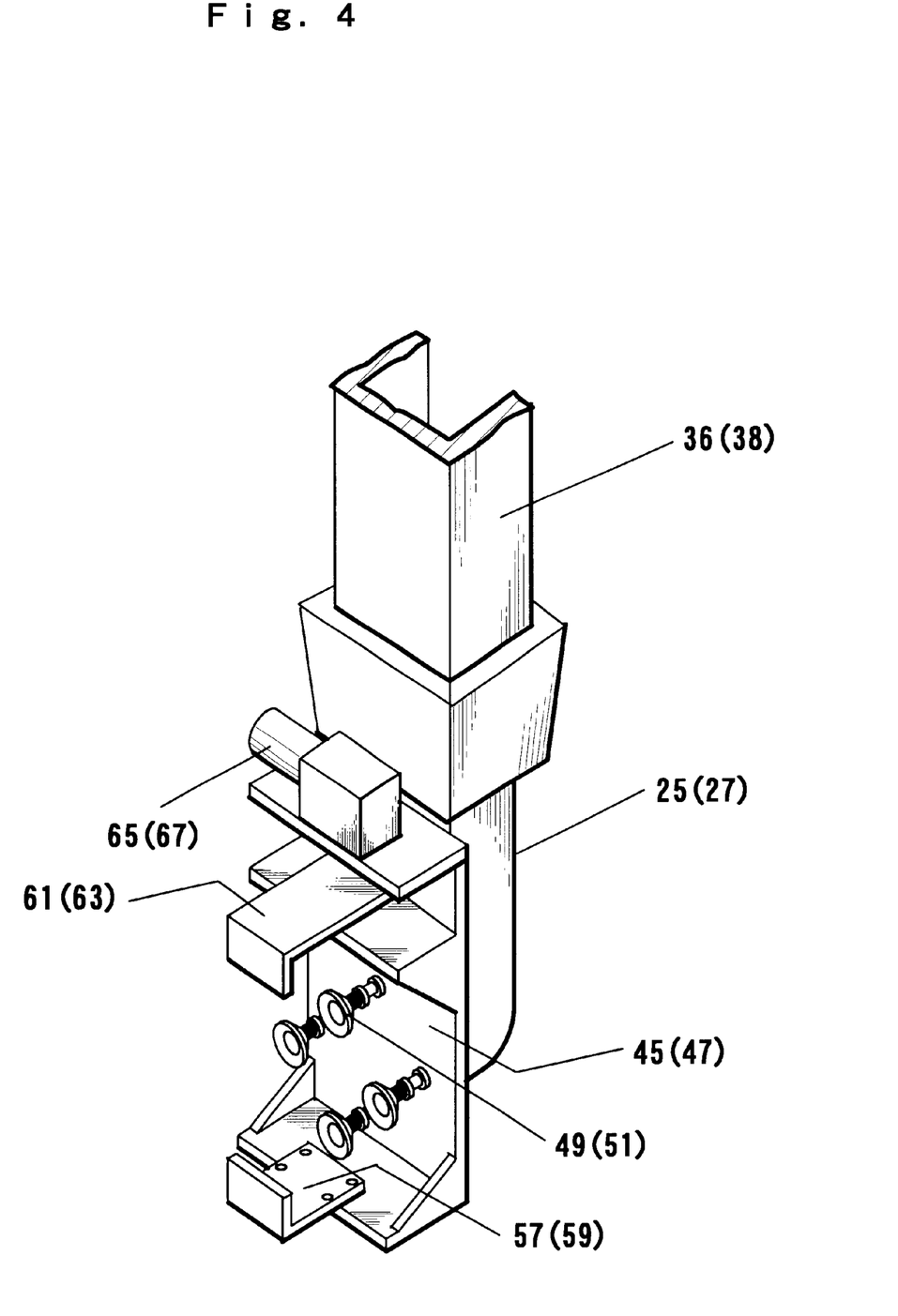
FIG. 4 is an enlarged perspective view of a chucking unit.

The first and second chucking units 25 and 27 are, respectively, attached to the lower part of the first and second attaching frames 36 and 38. Chucking plates 45 and 47 of the first and second chucking units 25 and 27 are provided with adsorbing members 49 and 51 which adsorb and hold a large-sized molded product 53 and clamping plates 45 and 47 which clamp the large-sized molded product 53. The clamping members 55 and 56 are composed of lower clamping claws 57 and 59 fixed at the lower part of the chucking plates 45 and 47 and movable clamping claws 61 and 63 movably attached in the vertical direction on the upper part of the chucking plates 45 and 47.

The movable clamping claws 61 and 63 are rotatably supported above the upper part of the chucking plates 45 and 47 so as to have an axial line in the vertical direction, and are engaged with feed screws 69 and 71 (illustrated in FIG. 9) coupled to electric motors 65 and 67 such as numerically controllable servo motors, whereby the movable clamping claws 61 and 63 are moved in the vertical direction in line with rotation of the feed screws.

Further, such a mechanism may be acceptable, which at least either one of the lower clamps 57/59 or movable clamping claws 61/63 is moved by a cylinder.

Figure 5:
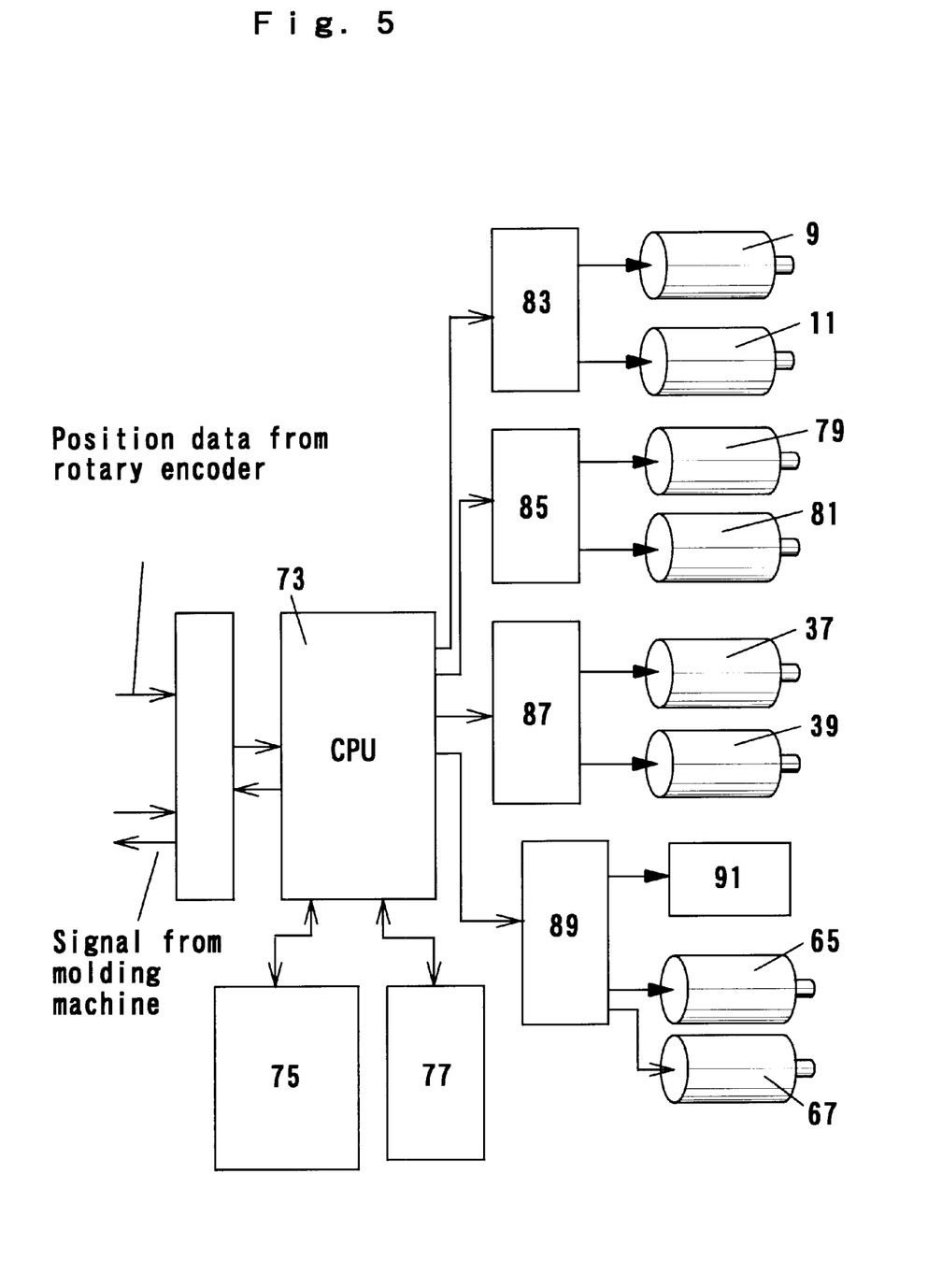
FIG. 5 is an electric block diagram showing a control unit of the removal apparatus for molded product.
Figure 6:
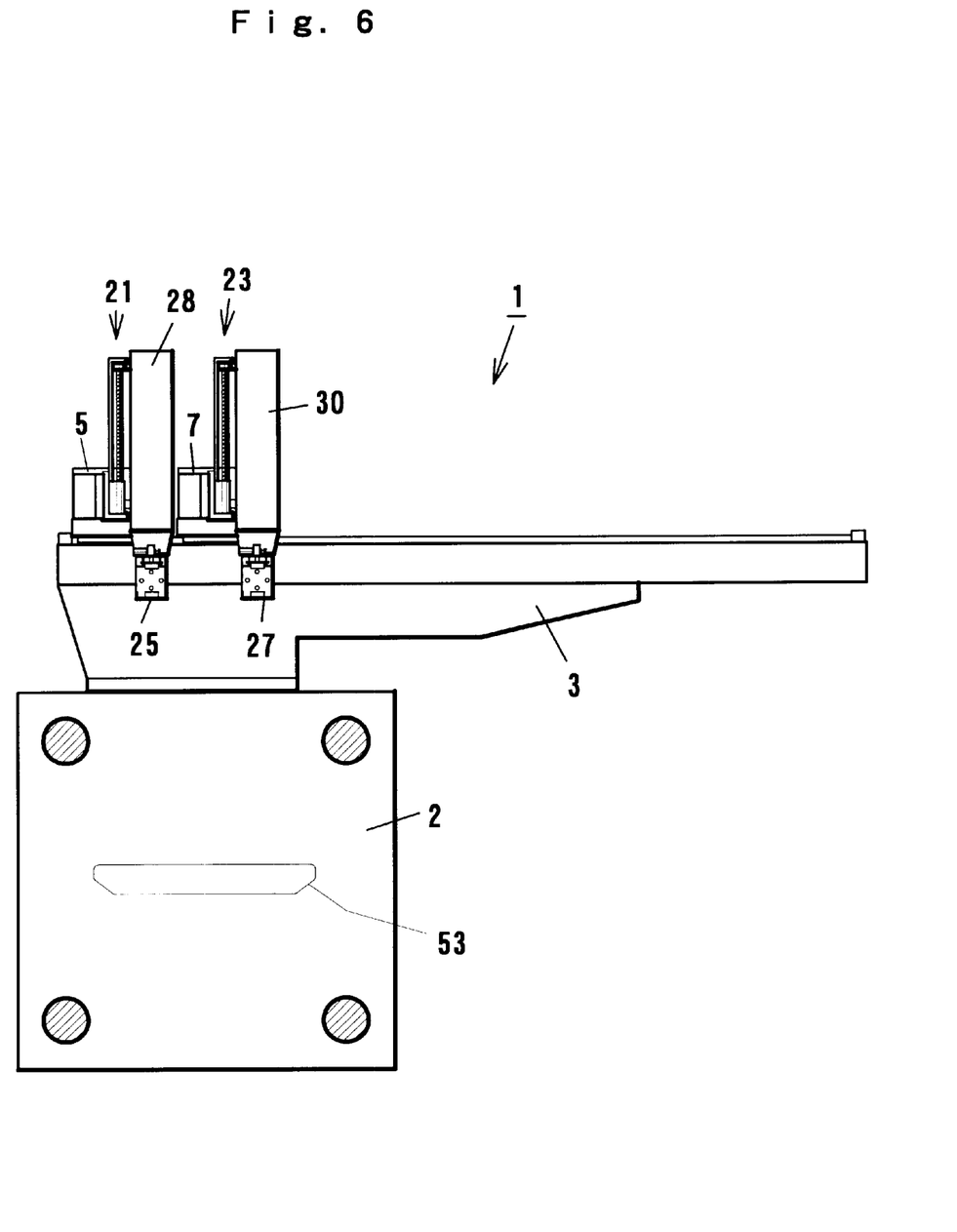
FIG. 6 is an explanatory view showing a state where the first and second carriages are moved to the molding section side.

ROM (read-only-memory) 75 and RAM (random-access-memory) 77 are connected, as a memory means, to CPU (central processing unit) 73 of a control unit. The ROM 75 stores program data to execute removal actions described later. Also, the RAM 77 stores moving position data of the first and second carriages 5 and 7, first and second cross carriages 17 and 19, and first and second vertical units 21 and 23, that is, the position data of the chucking units 25 and 27, respectively. Various types of data stored in the RAM 77 are rewritten by peripheral input devices such as a keyboard, a touch panel, etc., or a teaching operation for reading and storing the position data when the respective chucking units are moved to appointed positions on the basis of removal motions.

In addition, respective electric motors 9 and 11 which constitute a drive mechanism of the first and second carriages, electric motor 79 and 81 which constitute a drive mechanism of the first and second cross carriage, electric motors 37 and 39 which constitute a drive mechanism of the first and second vertical units 21 and 23 and electric motors 65 and 67 which constitute a drive mechanism of the movable clamping claws 61 and 63 are, respectively, provided with a position detector such as a rotary encoder, etc. Detected position signals from the position detectors are inputted into the CPU 73 via an interface, and the respective position data are stored in the RAM 77. The CPU 73 controls and moves the first and second carriages 5 and 7, the first and second cross carriages 17 and 19, and the first and second vertical units 21 and 23 by comparison between the data stored in the RAM 77 and predetermined position data.

A carriage driving circuit 83, across carriage driving circuit 85, a vertical unit driving circuit 87, and a chuck operating circuit 89 are, respectively, connected to the CPU 73, wherein the first and second electric motors 9 and 11 are connected to the carriage driving circuit 83, the electric motors 79 and 81 are connected to the cross carriage driving circuit 85, and electricmotors 37 and 39 are connected to the vertical unit driving circuit 87. These motors are numerically controlled on the basis of driving circuits corresponding thereto. Also, a valve 91, which connects and disconnects the adsorbing members 49 and 51 and a vacuum sucking device (not illustrated), electric motors 65 and 67 are connected to the chuck operating circuit 89.

Next, a description is given of a removal action of a large-sized molded product by a removal apparatus for molded product 1.

In FIG. 6 through FIG. 9, the first carriage 5 is controlled and moved so that the first chucking unit 25 is positioned at the illustrated left side from the center of the molding section above the molding section of a molding machine, and the second carriage 7 is controlled and moved so that the second carriage 7 is positioned at the illustrated right side from the center of the molding section above the molding section as in the above. At this time, an interval between the first carriage 5 and the second carriage 7 is adequately adjusted in accordance with the left and right length of a large-sized molded product 53 to be taken out.

Figure 7:
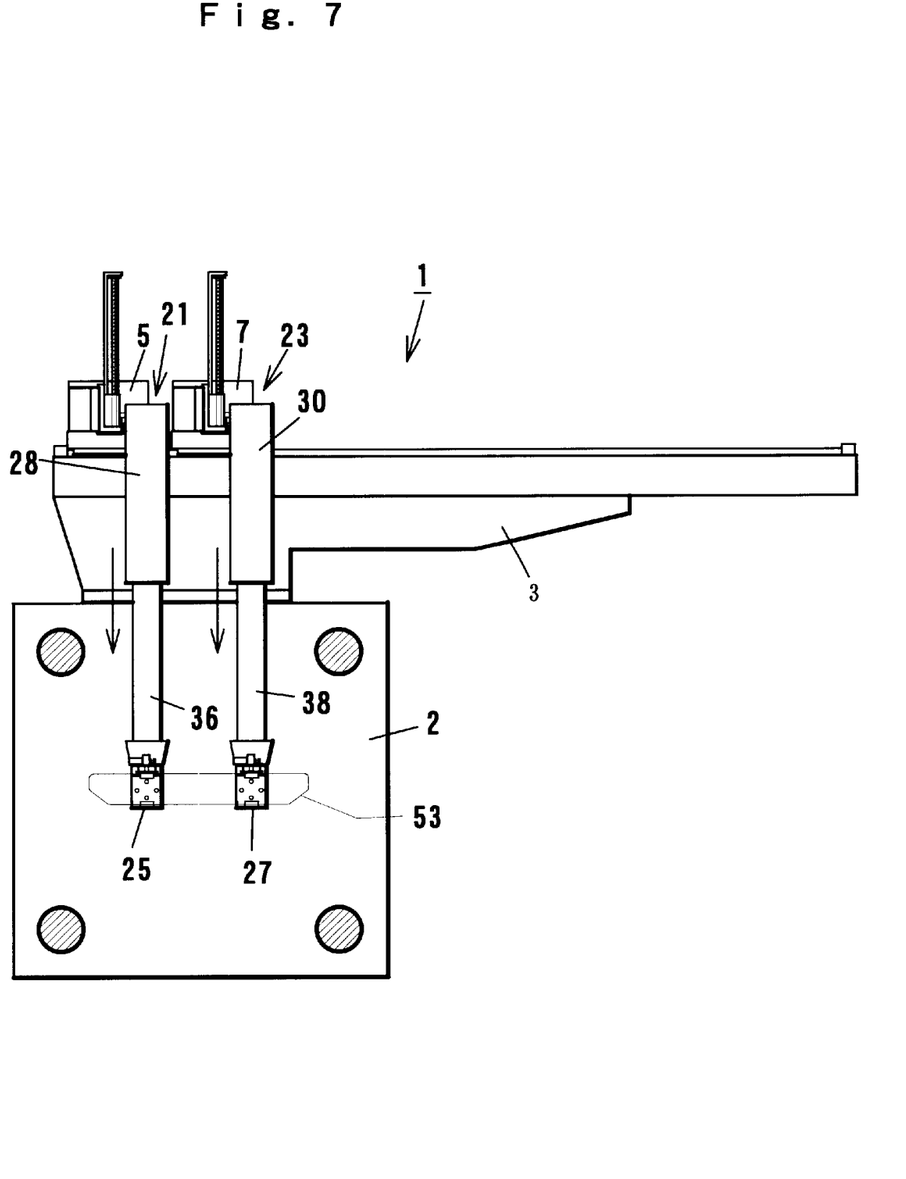
FIG. 7 is an explanatory view showing a downward moving state of the first and second chucking units.

As, in this state, a mold opening signal is inputted from a molding machine into the removal apparatus for molded product 1 upon completion of molding of the large-sized molded product 53, the control unit synchronizes and drives the electric motors 37 and 39 of the first and second vertical unit 21 and 23 and rotates the feed screws 33 and 35, thereby causing the first and second movable frames 28 and 30 to move downward and also causing the first and second attaching frames 36 and 38 to move downward. Therefore, the first and second chucking units 25 and 27 are, respectively, faced to the large-sized molded product 53 held in a movable mold (not illustrated).

Figure 8:
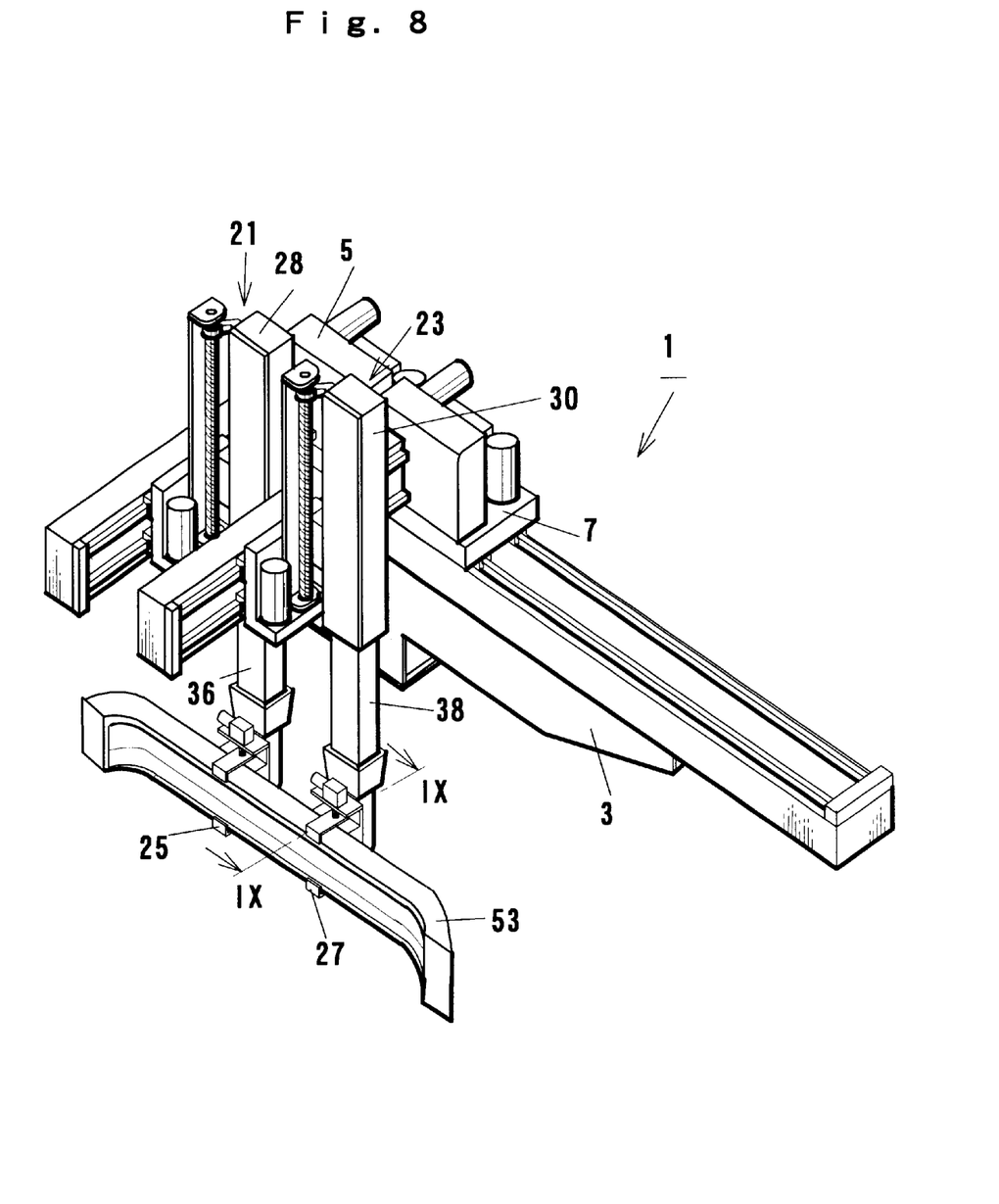
FIG. 8 is an explanatory view showing a holding state of a large-sized product.
Figure 9:
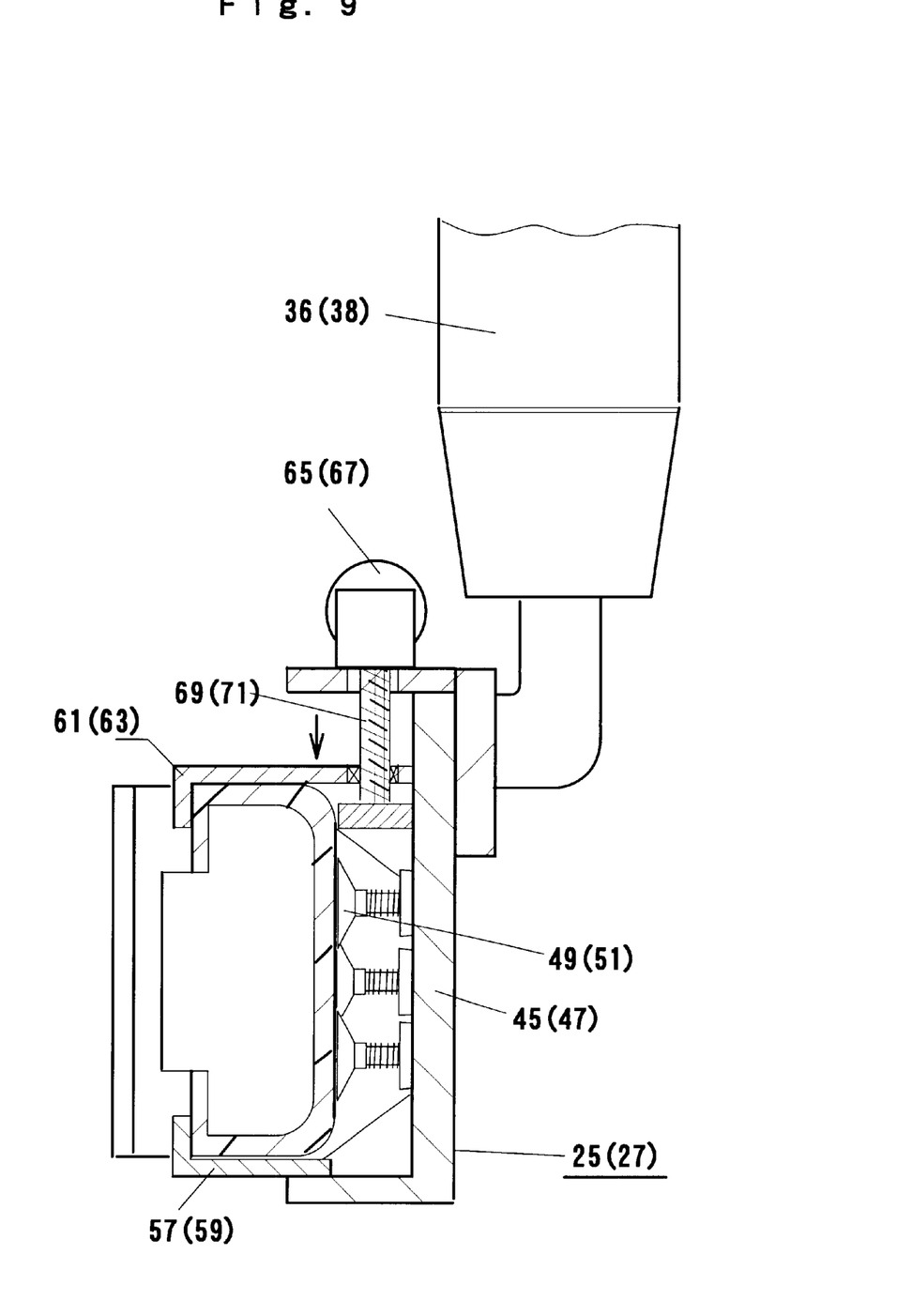
FIG. 9 is a cross-sectional view taken along the line IX—IX in FIG. 8.

Next, the control unit synchronizes and drives the first and second cross carriages 17 and 19 and brings the first and second chucking units 25 and 27 into contact with the large-sized molded product 53. At this time, the large-sized molded product 53 is adsorbed and held by the adsorbing members 49 and 51, and it is held by the movable clamping claws 61 and 63 and lower clamping claws 57 and 59, all of which move downward in line with drive of the respective motors 65 and 67.

The moving distance of the movable clamping claws 61 and 63 is taught in advance in accordance with the height of the large-sized molded product 53, so that the clamping force is preset so that the large-sized molded product 53 is adequately clamped.

Next, the control unit synchronizes and drives the first and second cross carriages 17 and 19 in the reverse direction with the large-sized molded product 53 held by the first and second chucking unit 25 and 27, and retracts the first and second chucking units 25 and 27, whereby the large-sized molded product 53 is drawn out from a movable metal mold. Next, the control unit synchronizes and drives the first and second vertical units 21 and 23 in the reverse direction, and moves the first and second chucking units 25 and 27, which hold the large-sized molded product 53 upward of the molding section. Thereafter, it synchronizes and drives the first and second electric motors 9 and 11 to move the first and second carriages 5 and 7 rightward in the drawings, whereby the first and second chucking units 25 and 27 which hold the large-sized molded product 53 to the release position side. After that, the control unit further synchronizes and drives, as necessary, the first and second cross carriages 17 and 19, and the first and second vertical units 21 and 23, whereby the first and second chucking units 25 and 27 are moved upward of a discharge conveyor or chute (neither illustrated), and thereafter the adsorbing members 49, 51 and clamping members 55, 56 release the large-sized molded product, whereby the large-sized molded product 53 is taken out onto the discharge conveyor or chute.

Further, upon the completion of the removal of a large-sized molded product 53, the first and second chucking units 25 and 27 are controlled and moved in the reverse direction in synchronization. The first and second chucking units 25 and 27 are returned above the molding section, and is repeatedly employed to remove a next-molded large-sized product 53.

In addition, when removing a small-sized molded product, one carriage 5 is moved to one end side of the travelling frame 3, and only the other carriage 7 is controlled and moved to remove a small-sized molded product by using only one removal unit.

In the preferred embodiment of the invention, since at least two removal units are used to remove a molded product, chucking units to hold a large-sized molded product 53 can be made small-sized, which may consist of light-weight universal chucking units. As a result, since the respective removal units are made small-sized and light-weight, the removal action can be accelerated, whereby it is possible to shorten the removal cycle.

A drive mechanism of the first and second carriages and first and second cross carriages may consist of belts, a part of which is f fixed at a movable member, extending between rotatably supported pulleys, and respective electric motors such as numerically controllable servo motors coupled to one of the pulleys, wherein the drive mechanism may be a belt drive mechanism for reciprocating the carriages by running of belts in line with drive of the electric motors.

Also, another drive mechanism may be available, for example, a feed screw drive mechanism that is rotatably supported between both end portions of the carriage 3, having electric motors such as numerically controllable servo motors coupled thereto, rotates two feed screws engaged with movable members, and thereby reciprocates the carriages.

Still another drive mechanism may be also available, for example, a planar linear motor drive mechanism that is attached to the frame and consists of a permanent magnet having a number of teeth formed at an appointed pitch (moving resolution power) and a number of pairs of electromagnets (none illustrated) secured at moving members faced thereto.

The vertical drive mechanism may be such that the first and second attaching frames 36 and 38 are, respectively, engaged with the respective feed screws 33 and 35 supported on the vertical frames 29 and 31, and the first and second chucking units 25 and 27 are moved in the vertical direction over a distance almost coincident with the axial line length in line with rotations of the respective feed screws 33 and 35.

What is claimed is:

1. A removal apparatus comprising:

a travelling frame extending between an upper part of a molding section and a release position outside a molding machine in a direction orthogonal to an axial line direction of the molding machine;

first and second carriages provided on the travelling frame so as to be movable in said direction orthogonal to the axial line direction of the molding machine;

first and second cross frames provided on the first and second carriages, respectively, so as to extend in the axial line direction of the molding machine;

first and second cross carriages provided on the first and second cross frames, respectively, so as to be movable in the axial line direction of the molding machine;

first and second vertical units provided on the first and second cross carriages, respectively, so as to be vertically movable;

first and second chucking units secured to the first and second vertical units at lower end portions thereof, respectively; and a control unit for synchronously controlling movement of the first and second carriages, the first and second cross carriages, and the first and second vertical units so as to enable the first and second chucking units to be moved in three dimensions for removal of a molded product from the molding machine.

2. The removal apparatus according to claim 1, wherein the first and second carriages have an interval therebetween which is variable in accordance with a length of the molded product.

* * * * *